(12) United States Patent
Alas et al.

(10) Patent No.: US 11,061,887 B2
(45) Date of Patent: *Jul. 13, 2021

(54) EVENT VERIFICATION RECEIPT SYSTEM AND METHODS

(71) Applicant: Guardtime SA, Lausanne (CH)

(72) Inventors: Risto Alas, Tallinn (EE); Hema Krishnamurthy, Phoenix, AZ (US)

(73) Assignee: Guardtime SA, Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/601,697

(22) Filed: Oct. 15, 2019

(65) Prior Publication Data
US 2020/0104294 A1    Apr. 2, 2020

Related U.S. Application Data

(63) Continuation-in-part of application No. 15/394,842, filed on Dec. 30, 2016, now Pat. No. 10,447,480.

(51) Int. Cl.
*G06F 16/23* (2019.01)
*G06F 16/901* (2019.01)

(52) U.S. Cl.
CPC ...... *G06F 16/2365* (2019.01); *G06F 16/9024* (2019.01)

(58) Field of Classification Search
CPC ............. G06F 16/2365; G06F 16/9024; G06F 16/9027; G06F 16/215; G06F 16/2246; G06F 16/27; G06F 16/273; G06F 16/275; G06F 16/278; G06F 21/64; H04L 9/3236; H04L 9/0637; H04L 9/3265; H04L 2209/38
See application file for complete search history.

(56) References Cited

U.S. PATENT DOCUMENTS

| | | | | |
|---|---|---|---|---|
| 9,679,279 B1* | 6/2017 | Smith | ...... | G06Q 30/06 |
| 10,402,452 B1* | 9/2019 | Evenson | ...... | G06F 16/9014 |
| 10,805,067 B1* | 10/2020 | Griffin | ...... | H04L 9/30 |
| 2017/0034217 A1* | 2/2017 | Anton | ...... | G06F 21/6227 |

(Continued)

OTHER PUBLICATIONS

Nikitin et al., "CHAINIAC: Proactive Software-Update Transparency via Collectively Signed Skipchains and Verified Builds", Proceedings of the 26th USENIX Conference on Security Symposium, Jun. 30, 2017. (Year: 2017).*

(Continued)

*Primary Examiner* — David T. Brooks
(74) *Attorney, Agent, or Firm* — Jeffrey Pearce

(57) ABSTRACT

An event is registered in at least one node server in a directed data structure, which comprises a computationally linked series of nodes such that each node encodes information included in at least one preceding node. Within at least selected nodes of the directed data structure after at least one initial node, a representation of at least one history data structure is included and has a highest-level value computed based on inputs of lowest level input values, at least one said lowest level input value encoding node-specific information of at least one preceding node. In a verification phase, a purportedly valid lowest level input value is verified by recomputing the corresponding highest-level value from the representation of the history data structure included in the corresponding node.

9 Claims, 10 Drawing Sheets

(56) References Cited

U.S. PATENT DOCUMENTS

| | | | |
|---|---|---|---|
| 2017/0279818 A1* | 9/2017 | Milazzo | H04L 63/145 |
| 2017/0331810 A1* | 11/2017 | Kurian | H04L 9/3213 |
| 2017/0364552 A1* | 12/2017 | Pattanaik | H04L 9/3297 |
| 2017/0366353 A1* | 12/2017 | Struttmann | G06F 21/64 |
| 2018/0089041 A1* | 3/2018 | Smith | G06F 16/2255 |
| 2018/0115428 A1* | 4/2018 | Lysenko | H04L 9/0637 |
| 2018/0359089 A1* | 12/2018 | Innes | G06Q 50/01 |
| 2018/0359096 A1* | 12/2018 | Ford | H04L 9/3236 |
| 2019/0147106 A1* | 5/2019 | Androulaki | G06F 16/90335 707/722 |
| 2019/0363892 A1* | 11/2019 | Wang | H04L 9/3297 |

OTHER PUBLICATIONS

Ford, Bryan, "How Do You Know It's on the Blockchain? With a SkipChain", https://bford.info/2017/08/01/skipchain/, published Aug. 1, 2017. (Year: 2017).*

* cited by examiner

US 11,061,887 B2

EVENT VERIFICATION RECEIPT SYSTEM AND METHODS

CROSS REFERENCE TO RELATED APPLICATIONS

This application is a continuation-in-part and claims priority of pending U.S. patent application Ser. No. 15/394,842, which issued as U.S. patent Ser. No. 10/447,480 on 15 Oct. 2019.

FIELD OF THE INVENTION

This invention relates to data verifiability, in particular, for data registered in directed data structures.

BACKGROUND

Data security has rapidly progressed from being an issue for only a few government and military entities to being a concern for almost everybody who uses or even deals with those who use a computer, "smart phone", etc. "Security" can mean many things depending on the context. Just two of the very many examples are preventing others from accessing personal or otherwise confidential data, and detecting tampering. Sometimes, "security" means just being able to prove that some digital event happened or did not happen.

A common way to ensure data security is to have a trusted repository, with access controlled using such devices as passwords, digital certificates, encryption and keys, etc. In one sense, this simply removes the problem to a higher level, in that one must then trust the security procedures of the repository, the authority that issued the certificates and keys, etc. Moreover, the need for verifiability is increasing rapidly, with countless financial, business, technical, and other events being recorded in some way in remote storage such as in the "cloud". With the advent of the "Internet of Things", in which essentially everything that can pass data to a network may be communicating information for storage, central repositories and verification mechanisms are becoming more and more impractical.

One development that is showing promise as a way to register and verify information without reliance on centralized control is a data structure known as a "blockchain". See FIG. 1. Although the term "blockchain" itself, as well as related terms, do not yet have universally accepted definitions, typically a "blockchain" 1000 is understood as being a data structure comprising a series of usually (but not necessarily) time-stamped blocks $b_j, \ldots, b_{j-2}, b_{j-1}, b_j, \ldots$, where each block includes not only submitted data, but also a hash $\mathcal{H}$ of all or some subset of the contents of the block, plus various metadata, hashed together with linking data, such as the hash output, of all or some sub-set of the data in an immediately preceding block. Thus, for example, block $b_j$ not only contains it own hash value $\mathcal{H}_j$, but also a link from the previous block $b_{j-1}$ based on its hash value $\mathcal{H}_{j-1}$.

As FIG. 1 illustrates, data to be entered in the blockchain 1000 may be submitted as "transactions" by any of a set of client systems 100, via one or more communications channels such as networks, to one or more intermediate nodes 200, such as servers, which may also create transactions and comprise clients in their own right. The nodes 200 then typically aggregate one or more transactions into data blocks, and then some reconciliation mechanism 400 is applied to determine which blocks of which nodes are to be included in which order in the actual blockchain 1000, which may then be distributed (indicated by arrow 1100) or at least made accessible to the nodes 200.

Different reconciliation protocols have been suggested, the most common of which is the "proof of work" (PoW) arrangement used in the Bitcoin system. According to the PoW protocol, highest level ones of the nodes 200 act as "miners" who must solve a difficult computational problem; the first to solve it—which is easily verifiable by other nodes—is then allowed to enter the next block in the chain 1000. One known problem with the PoW arrangement is that it can have a settlement time on the order of many minutes, or at least many seconds, which leads to severe problems of scalability.

As another example, in some other systems, the various nodes "vote" and, according to some predetermined routine, come to a consensus as to which block is to be entered next into the blockchain 1000. Still other reconciliation protocols are known. One problem with such a voting protocol is that the set of voting nodes may change over time. One or more, for example, may become unavailable, no longer a member of the group, such that later confirmation of the "votes" may become difficult or, if reliant on currently unavailable and/or invalid keys, impossible. The network of servers established to enable verification of events recorded into blocks of the blockchain may therefore no longer be able to perform its intended function.

However it is established, the blockchain can then be used as, or as the basis of, a public ledger, which is typically an append-only database achieved by distributed consensus of multiple participants. Once data is entered into a block of the chain, the entry is essentially irrefutable, since any tampering with the data would be reflected in the chained hash calculations and thus easily detected.

As with other "real-life" transactions, users such as the clients 100 and/or the nodes 200 may want or need proof that a transaction was actually entered into the blockchain 1000. In other words, there is a need for an efficient way to provide receipts of entry into a data structure such as a blockchain. One difficulty in this regard is that, for proper verification that a block exists in the blockchain, many existing blockchain systems require calculation along the chain from some known valid point and through every intermediate block. This is turn presupposes that all the intermediate blocks are stored and available, which typically precludes deletion of those blocks, for example, to save storage.

DETAILED DESCRIPTION

This invention involves different embodiments that involve including as elements of an irrefutable data structure various features that enable creation of a "receipt" that helps prove that a transaction or other information such as, for example, metadata relating to the state of the data structure itself, was validly entered into the data structure. Thus, different embodiments improve the functioning of the network of systems, such as servers, by helping them reduce or totally eliminate ambiguity that otherwise might defeat their purpose and or at best require inefficient, extra inter-server communication.

Because of its current growing importance, the irrefutable data structure is described, at least initially, as a blockchain, although other options are mentioned below. One current point of dispute when it comes to the concept of a "blockchain" is whether, by definition, any entity may be allowed to submit blocks to and verify blocks in the blockchain, possibly only upon meeting a PoW requirement, or whether the entities that may submit to and verify blocks in the data structure must be permissioned by some central authority. In other words, there is dispute as to whether "blockchain" by definition implies "open" or not. Embodiments of this invention do not presuppose either definition, but may be implemented with both types of blockchain.

Assume, by way of example, that a user 200 wishes to be able to prove that an event has occurred. The event either begins in digital form, or, using appropriate known methods, is reduced to being in digital form. There are in practice an almost unlimited number of such events. For example, the state of a vehicle, such as moving/stationary, position, speed, status of various engine components, etc., may be sensed and the corresponding signals may be converted into a set of digital data. Similarly, the state and operational parameters of an industrial machine or process may be sensed, accumulated, and converted into digital form. Video from a security camera may be processed into a transmittable file as a blockchain-recordable "event", etc. The signature of a customer on a credit card receipt may be digitized and stored along with the receipt itself may be an "event", as may a purchase order. And so on. Our world is full of "events", each of which, as used here, is any set of digital information that can be transmitted via a network, for example, a file that has been created or a record of something that has happened or that is observed.

Validator Identifier Embodiment

Figure 2:
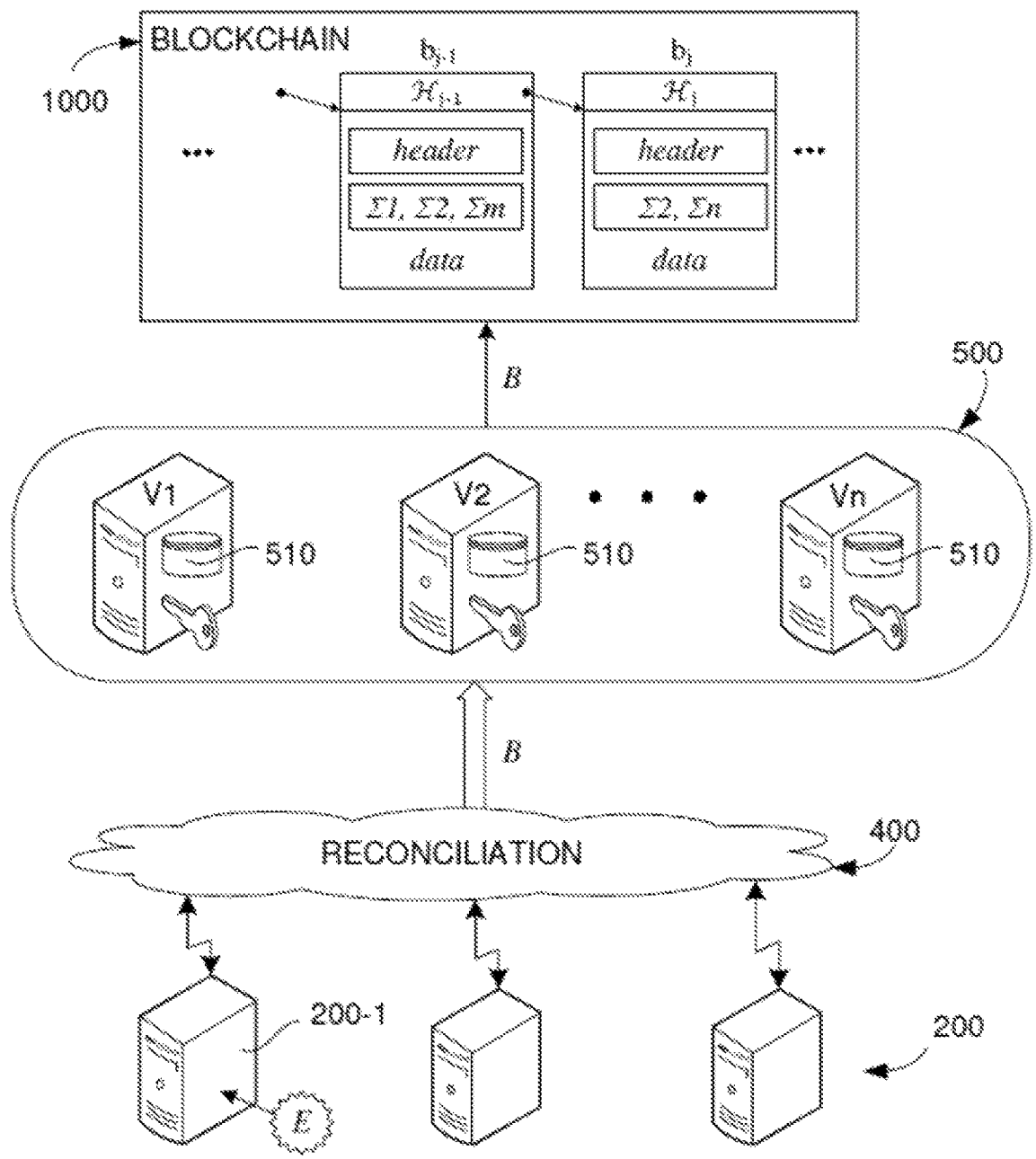
FIG. 2 illustrates an embodiment of a blockchain receipt system in which blocks store digital signatures of validators.

See FIG. 2. Merely by way of example, assume that an event E has occurred and has been sensed, via any appropriate sensor(s), input (for example, by a user), or taken place within one of the clients 200-1 and that the event is either already represented in digital form, or has been converted into digital form by any conventional means. In short, assume some data set, however formed, representing E and any chosen metadata, has arisen, been created or made available to client 200-1 and that this event is to be entered into the blockchain 1000. In some cases, the data corresponding to the event may alone be formed into a set suitable for submission as a block B to the blockchain; in other cases, using known protocols, the event data may be combined with data from other events into a suitable block B.

Assume also, however, that one or more entities is expected to validate the block B before it is entered into the blockchain 1000. For example, before a flight plan is committed to the blockchain, so as to be later verifiable, a traffic control system, a system controlled by the airline, and an onboard flight director system may be expected to verify the information in the block B, or at least one of B's component events, before it is committed to the blockchain.

As another example, there may be some plurality of validating entities, and at least some threshold number of them may be required to validate the event or block before the block is committed. For example, any of a group of government agencies might be designated as being competent to approve of a block, which may be committed to the block chain as long as some threshold number of them do so. In a simpler case, assume that parties to a proposed contract must validate the submitted text before it is committed to the blockchain. In general, assume that a threshold number m of a set of n authorized validator systems, that is, validators V1, V2, . . . , Vn is either necessary, or sufficient (as determined by the system designer), to verify that a block in the blockchain is valid.

Although the validators V1, V2, . . . , Vn are shown as being separate from the reconciliation system 400, this is not necessary; rather, depending on the implementation and the nature of the blockchain 1000 used, any or all of the validators 500 could also be part of the system 400 used to decide which block B is to be submitted for inclusion in the blockchain in the first place. In general, some systems will be storing the entire blockchain, or at least the currently active portion of it. These are the "ledger nodes" and may be the validators, other systems making up the reconciliation system, or other systems altogether, or some combination of these. Merely for the sake of simplicity, the description below uses as its example the case in which the validators are also the ledger nodes, storing the blockchain, and also may be the entities comprising the reconciliation system. As mentioned above, however, this is not necessary to embodiments of the invention.

As FIG. 2 illustrates, the validators include a respective storage system 510, in which some representation of the most recent, or at least some valid, version of the blockchain is stored. This is in keeping with the nature of a blockchain being distributed. The blockchain 1000 is thus, in practice, maintained as a dynamic data structure within the storage systems 510, thus comprising a form of database of representations of events as encoded in the blockchain's blocks.

According to the embodiment illustrated in FIG. 2, each member V1, V2, . . . , Vn of the validator set has an identifier $\Sigma$ that is either directly, or, via a known transformation, indirectly readable and recognizable by other entities. Let $\Sigma i$ be the identifier for validator Vi. Each validator that validates a block that is entered into the blockchain 1000 thus also includes its identifier $\Sigma$ as part of the data in the respective block. In FIG. 2, block $b_{j-1}$ is shown as having been validated by validators V1, V2, and Vm, whereas block $b_j$ has been validated by V2 and Vn.

The receipt returned to whichever entity that submitted either an entire block, or an event that is included in a block, may contain the information typically used to identify the block, the various events ("transactions") encoded in the block, the time the block was created, other metadata, etc. In general, a receipt will be a vector of different data values, which may be compiled and transmitted by any of the validators 500, by any of the entities in the reconciliation system 400, or by some other administrative system, to the corresponding user over any network or otherwise.

The receipt may also include (either as a single transmission, or as a separate part of the receipt transmission) information sufficient to communicate the identifier(s) of the validator(s) of the block. To enable self-verification, these identifiers may for example comprise a digital signature of each respective validator. The confidence of the user, or any other entity with the receipt, can then be greater, if one or more of the validators is trusted to be particularly reliable, for example, an authoritative governmental agency, or a major bank, or even a trusted individual, etc., depending on the nature of the event.

Of course, if the identifiers $\Sigma i$ are cleartext, a malicious entity could more easily fake validation of a block. The identifiers therefore preferably are based on some secure protocol. For example, using a Public Key Infrastructure (PKI)-like public-private key system, the receipt could encode the validator's underlying digital certificate, which ensures that the validators remain more transparent all the time. This would also allow the user to verify with validation keys it does not yet know about. As a convenience, the receipts could even be, for example, PDF files (for example, including portions of the block data and/or metadata, or some other file) signed by PKI signatures of the validators, with a separate receipt portion that contains the validator set 500 history. The user would then not have to figure out whether they trust the validators during validation. As long as the appropriate public keys of the validators are made available to those who might need to validate the authenticity of a block receipt, this would allow the validator set to completely change over time, and so long as the entities of the last validators are trusted, the latest validator set can directly be authenticated.

One possible disadvantage of this arrangement is that, after a long time, users may not remember which entities were authorized even to host the blockchain at the time. In such a case, the current validators could maintain a list of the previous validator set, which may be provided to users as needed or upon request; alternatively, depending on the context, after having an event successfully entered into the blockchain, clients could themselves also store the identifiers of the validators involved at the time.

History Tree Embodiment

Hash trees, sometimes known as Merkle trees, are well known in the fields of cryptology and computer science. In summary, a hash tree's lowest-level "leaf" inputs, which are iteratively combined, usually pairwise using hashing, until a single "root" value is obtained.

Figure 3:
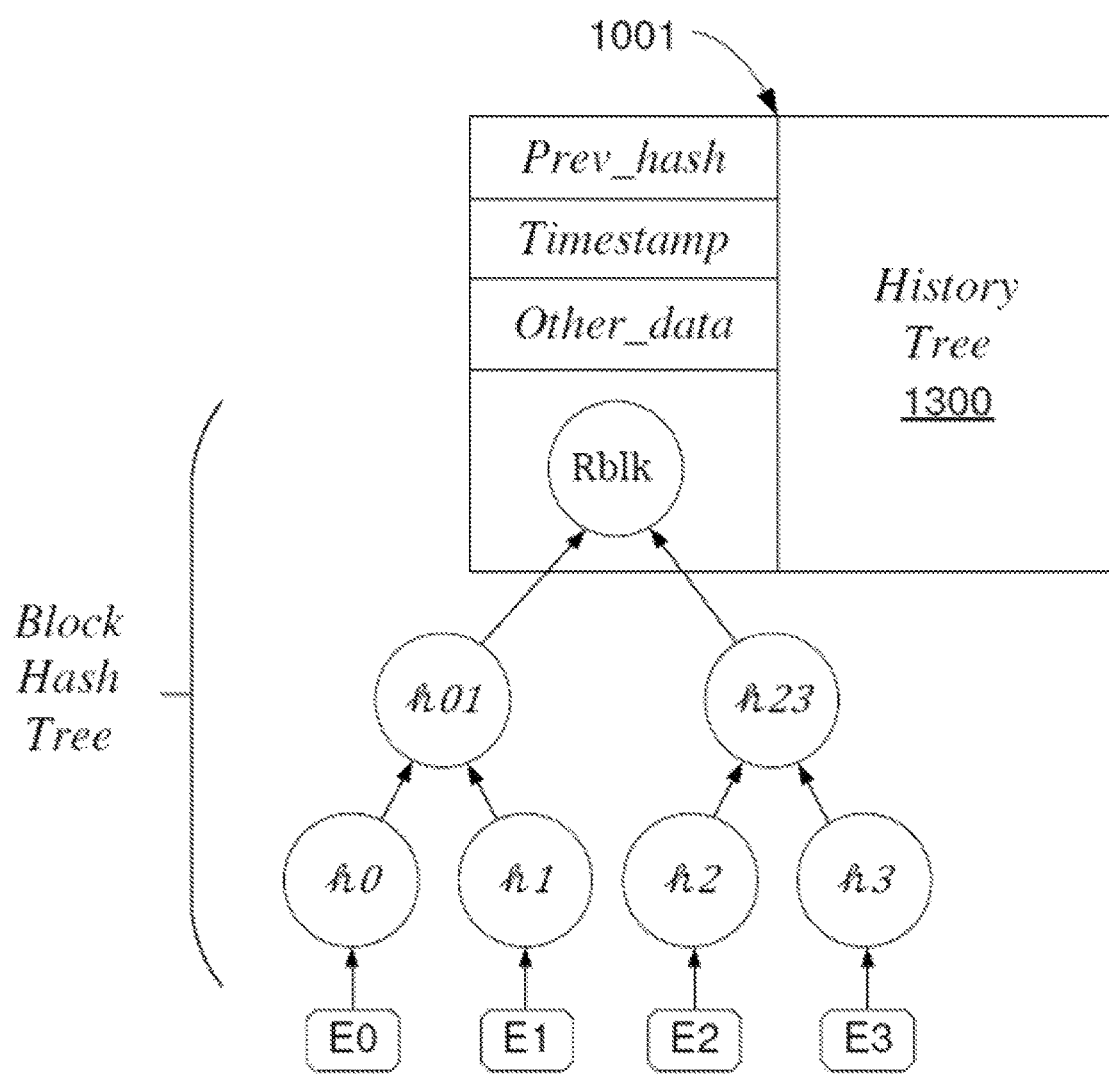
FIG. 3 shows one example of a block that includes, in addition to some conventional data elements, also includes a history tree.

See FIG. 3, which illustrates typical elements of a blockchain block, but also including a novel "history tree". In the simple example shown in FIG. 3, four transactions or "events" E0, E1, E2, E3 are to be encoded in a blockchain block 1001. Events may also include information other than what an external entity wishes to record in the blockchain; for example, an event may encode metadata about the submission itself, about the state of the blockchain or its hosting server(s), etc. As for "servers" plural, the blockchain or any alternative data structure used (examples given below) may also be sharded, in which case a different history data structure may be included in the different shards, possibly with one "master" server maintaining a global history structure that encodes all the sharded ones.

Figure 1:
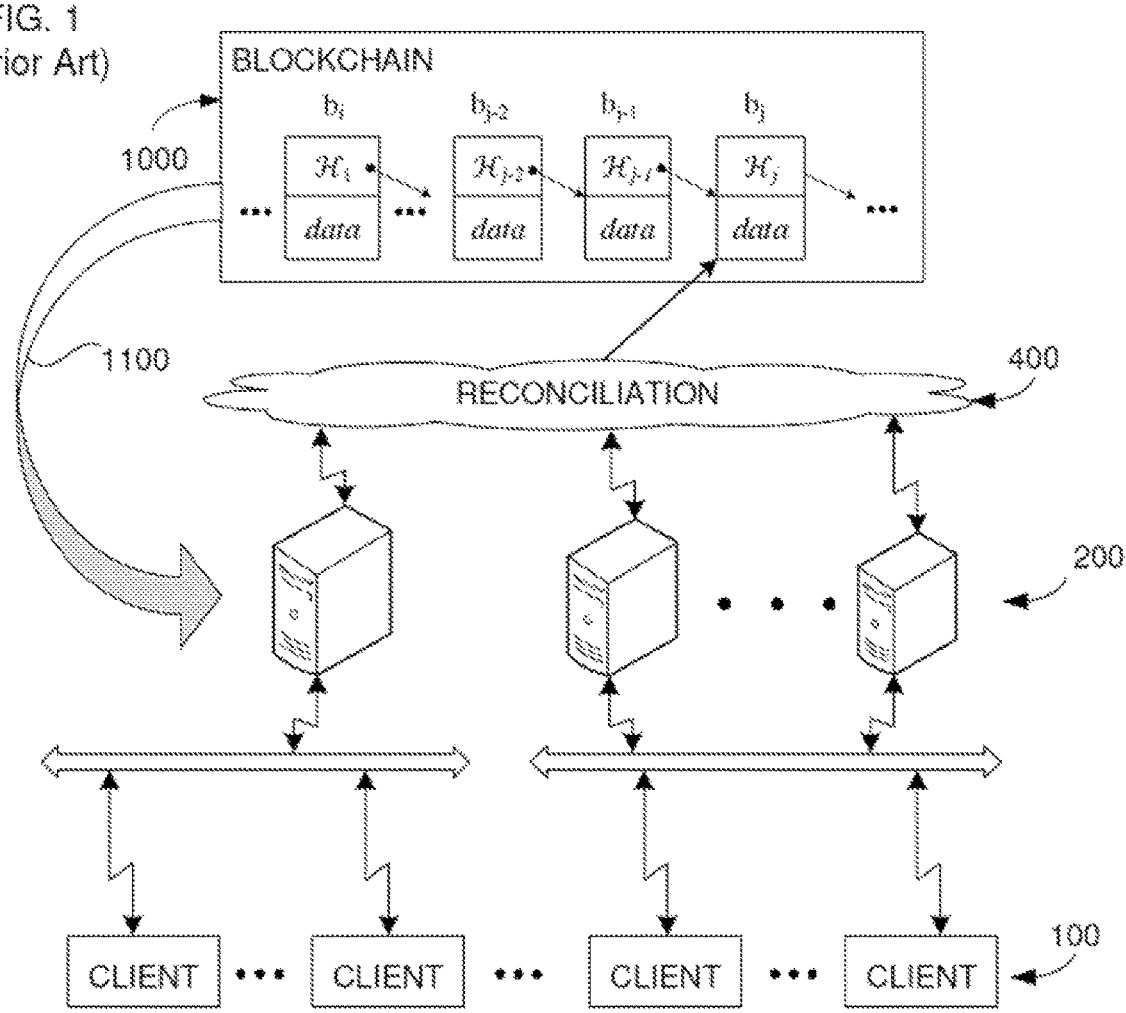
FIG. 1 illustrates the general structure of a blockchain system in the prior art.

Similar to the blocks in FIG. 1, block 1001 includes the hash Prev_hash derived from the immediately preceding block, as well as other chosen data/metadata Other_data; for example, an identifier or even name of the blockchain itself may be included in each block, along with a block ID or series number, etc. In many blockchain implementations, each block also includes a timestamp indicating when it was created or appended or the blockchain.

Even in many conventional blockchains, the block may also include as an element the top-level "root" value of a binary hash tree—shown in FIG. 3 as the "Block Hash Tree"—that has, as its lowest level values, a digital representation of each event to be included or otherwise represented in the block. In the illustrated example, events E0-E3 are therefore hashed to yield $\hbar 0$-$\hbar 3$, respectively. These hash values are then in turn pairwise hashed, such that $\hbar 01$=hash($\hbar 0$, $\hbar 1$) and $\hbar 23$=hash($\hbar 2$, $\hbar 3$). The root value Rblk of the block hash tree is thus Rblk=hash($\hbar 01$, $\hbar 23$). In other words, at every level of the tree, each node will have a "sibling" with which it is hashed to yield the value at the next highest level, which is in turn hashed with its sibling, etc., until the top-most root value is reached.

Now consider event E2. If $\hbar 3$ and $\hbar 01$ are known, in addition to E2, it will be possible to compute Rblk. Thus, given a vector of "sibling" values leading up along a computation path through the hash tree, one can determine whether a purportedly correct representation E* of an event is in fact identical to the original E by iteratively, pairwise hashing the vector elements until a single topmost value is obtained. If this single value is equal to the root value Rblk then one can know that at least the input E* is equal to the E that was used to compute Rblk. This vector is therefore preferably included as part of the receipt sent to each event's originator as soon as the corresponding block is formed and included in the blockchain.

Figure 4:
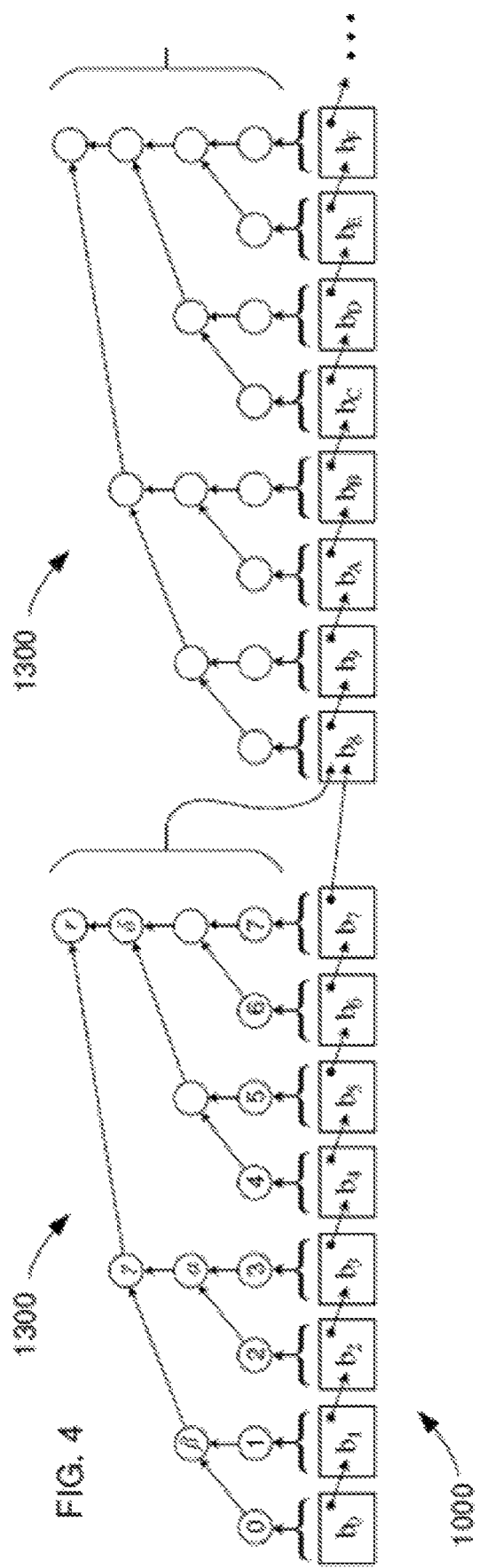
FIG. 4 illustrates an embodiment in which blockchain blocks store progressive blockchain history trees.
Figure 5A:
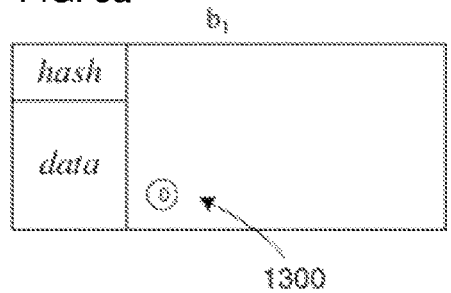
FIGS. 5a-5h illustrate a series of history trees within blocks.
Figure 5B:
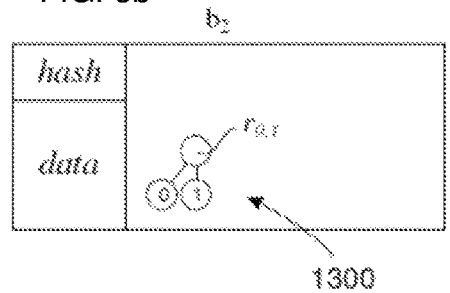
Figure 5C:
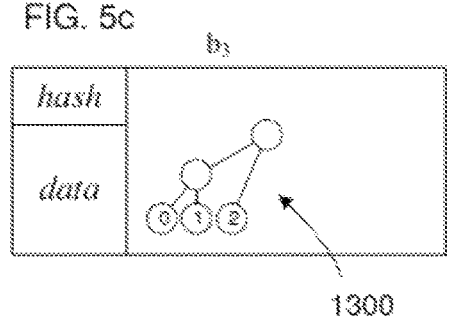
Figure 5D:
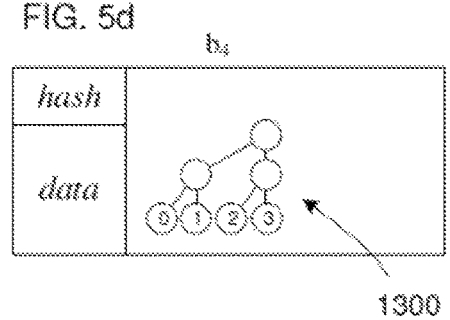
Figure 5E:
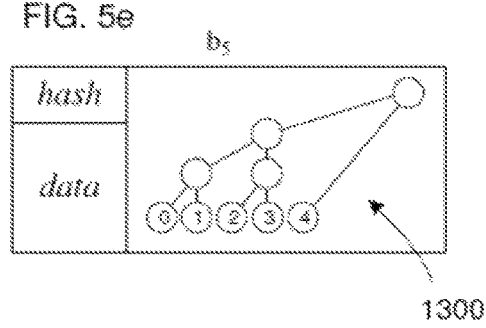
Figure 5F:
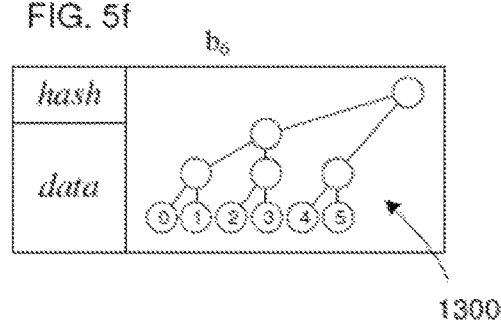
Figure 5G:
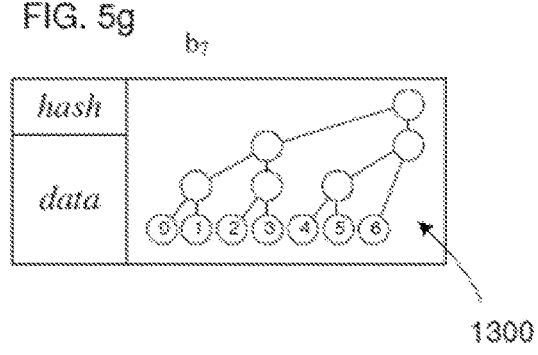
Figure 5H:
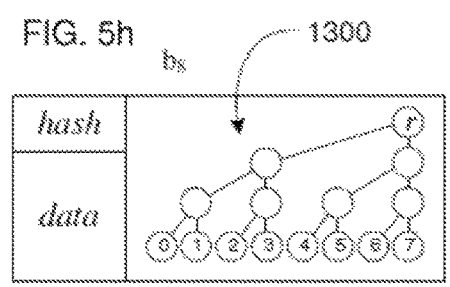

See FIG. 4. In this embodiment, blocks are grouped, either by time, or by number, or some combination of both (such as a minimum and/or maximum number of blocks per group, or a minimum and/or maximum time during which blocks are created and added to the blockchain). Assume just by way of a simple example that there are eight blocks per group. (In most practical implementations, there will usually be many more.) In the example shown in FIG. 4, two block groups are shown, namely, $b_0$-$b_7$ and $b_8$-$b_F$.

As illustrated, in this embodiment a hash tree—the history tree 1300—is created for each block group, with data associated with each block in the group forming the lowermost leaves of the group's hash tree, shown in the figure as circles numbered 0-7. Note that this history tree is "on top of" the blockchain, and is not the same as the block hash tree illustrated in FIG. 3. The data from each block used as an input to the respective tree may be chosen as any data that is uniquely associated with and identifies the block. Depending on the block size, one option would be to hash the entire contents of the block and use that value as the "leaf" value of the tree. Another option would be to use either a "raw" representation, or a hash, or some other transformation, of only a subset of the block information, such as the event data, the block hash tree root value, block ID, time, or any other sub-set. The important point is that the value submitted as the "leaf" input for each block should preferably be difficult for a malicious actor to fake using any other data as input to the hash or to "reverse" the transformation used to create the leaf value.

As shown in FIG. 4, the root value of the tree constructed on the group of block $b_0$-$b_7$ is labeled as the top node r. In this embodiment, the $b_0$-$b_7$ tree, including its root value r. is stored in the beginning block $b_8$ of the following group $b_8$-$b_F$. Similarly, block $b_0$ will include and encode the hash tree and root value for the previous block group, and the tree of the block group $b_8$-$b_F$ will be stored in the first block of the next group. What this means is that every block may encode information identifying every preceding block back to the first "genesis" block. (Another option is described below.)

Of course, the root value of the tree for a block group will not be available until the last block in the group has been created. FIGS. 5a-5h illustrate how partial hash trees may be stored in non-initial group blocks. Thus, when block $b_1$ is being formed (FIG. 5a), the only previous block in the group is $b_0$, so the only portion of the block's tree available at the time is leaf 0; this leaf 0 is therefore stored in block $b_1$. When block $b_2$ is being formed (FIG. 5b), previous blocks $b_0$ and $b_1$ will already exist, such that leaves 0 and 1 can be combined in the Merkle tree to form an intermediate root value $r_{0,1}$; the partial, two-leaf tree and its root value $r_{0,1}$ is therefore stored in block $b_2$. This process may be continued, as shown in FIGS. 5c-5g, with the partial trees of preceding group blocks being stored in each group in turn until, after block $b_7$ has been completed, an entire group hash tree can be formed and stored in the first block $b_8$ of the next block group.

Now assume that a malicious entity adds an "unauthorized" block to the blockchain, or deletes some block. In prior art systems, the main way to determine whether a given block is valid would be to compute forward from some previous block known to be in the correct blockchain path; this could involve a large, or even very large, number of computations, which may have the additional disadvantage of being too large for processing systems with relatively smaller storage capacity or processing power, such as mobile phones.

Now return to FIG. 4 and consider block $b_2$. If an entity has $b_2$ and the value of leaf 3, it can compute $\alpha$=hash(leaf 2, leaf 3). Given the value $\beta$=hash(leaf 0, leaf 1), however, $\gamma$=hash($\beta$, $\alpha$) can be computed, and given $\delta$=hash(hash(leaf 4, leaf 5), hash(leaf 6, leaf 7)), the root value r=hash($\gamma$, $\delta$) can be computed. In short, iterative, pairwise hashing of block hash tree "sibling" values should lead to the root value: a is the parent node of siblings leaf 2 and leaf 3; $\gamma$ is the parent node of siblings $\beta$ and $\alpha$; and the root value r is the parent node of siblings $\gamma$, $\delta$. Given the leaf 2 value, therefore, the only values that are needed to compute the root value r are the leaf 3 value, $\beta$ and $\delta$, since all other intermediate values can be calculated from these. As is known in binary hash tree structures, given n leaves, only $\mathcal{O}(\log_2 n)$ values will be needed to recompute the root value r. Given a purportedly authentic copy of the information in a given block, in particular, of the information used to compute its history tree leaf value, and the parameters defining the history tree at that point in the blockchain, any entity can evaluate the proof of correctness, in that recomputation of the hash tree path from the leaf up to the root must be correct to the bit for the original root value to be recomputed.

The root value of a given block group may also be used to quickly compute "forward", through later block groups to a current group, and be used in the computation from a later leaf up to its respective group's root value. Systems that rely on a fixed set of validators are more vulnerable to undetected tampering with blocks than this embodiment, since the validator set 500 is more easily compromised (for example, even by a validator who has become an inside threat). In contrast, the history tree is stronger against such blockchain manipulations since it fixes the blockchain history itself. In this embodiment, blocks include at least partial history trees, each of which may encode information of the entire blockchain history, if the blockchain has been tampered with, an attempt to return a receipt for an invalid block would also require an ability to construct a correct history tree within the block.

In one embodiment, the root value Rblk is used as the leaf, or one of the leaves (together with any other chosen data elements), submitted to the history tree. Thus, for example, in FIG. 4, the Rblk value (which, itself is a hash value) for block $b_2$ block may be used as leaf 2 in the history tree. This would allow a later verifying entity to validate a transaction conveniently by just "plugging" the information inside a receipt into the history tree, to see if the hashes match up all the way from the event representation to the root of the corresponding history tree.

Different methods may be used to reduce the size of the history trees stored in blocks and/or required by the entities, such as, for example, validators, that generate receipts. In some implementations, some blocks may encode information that is more important than others, for example, events that have a higher classification level (such as Top Secret as opposed to only Confidential), or corresponding to higher value (such as above a chosen minimum order size or price), or from preferred clients, etc. In these cases, the system could build and store the history trees based on the leaf values of only the important blocks.

Another method would be to archive older parts of the history tree, for example, according to a schedule, and use the root of the archived part of the tree as the first leaf of a new tree. The archived portion of the tree may then be signed using any known method so as to prevent or at least be able to detect later tampering or corruption. This method may also be used independent of the notion of archiving. For example, certain blocks may be designated as "anchor blocks", essentially restarting the tree construction over.

In the embodiment shown in FIG. 4, such anchoring occurs regularly every n'th block, but it need not be so regular. Rather, validators and/or the systems in the reconciliation system 400 (which may be wholly or partially the same as the validator system 500) may choose anchor blocks according to other criteria. For example, the validators may, either on a schedule or after some triggering event occurs (such as a suspected security breach, etc.) "audit" the blockchain. One way to do this is for the validators to compute forward through all blocks from any chosen block known to be correct (a previous anchor block), and in the correct path, to a more recent block, which they can then designate as the new most recent anchor block. An auditing system could also take and store "snapshots" of the blockchain in a database, or of chosen, possibly particularly important, or randomly selected, blocks. This auditing system would then later be able to compare the stored blocks with those in the blockchain to detect any changes, or at least to confirm that those blockchain blocks are still valid; as described below, such "validated" blocks may be used as anchors from which to calculate forward to validate other sections of the blockchain. The auditor may also periodically ask for hash paths of the selected, stored blocks in the latest history tree and then double-check if the latest block still contains the same transactions.

Still another method to reduce the size of history trees stored in blocks is to have multiple aggregation levels. Assume, for example, that blocks are grouped daily (or hourly, etc.), such that a group hash tree is created daily (hourly, etc.). There will then be a new root value each day. These root values may then be used as leaves of a second-level tree, with a higher level root value. The daily root value can then be used as the first leaf of the next day's history tree. Recomputation paths from blocks can then be extended from the first-level root values up to higher level root values.

Still another way to reduce the storage requirements for the hash tree is to include in the block a pointer, such as a URL or database address, to the full representation, which can then be downloaded as needed, for example, from the validators, or from a separate archiving system.

Figure 6:
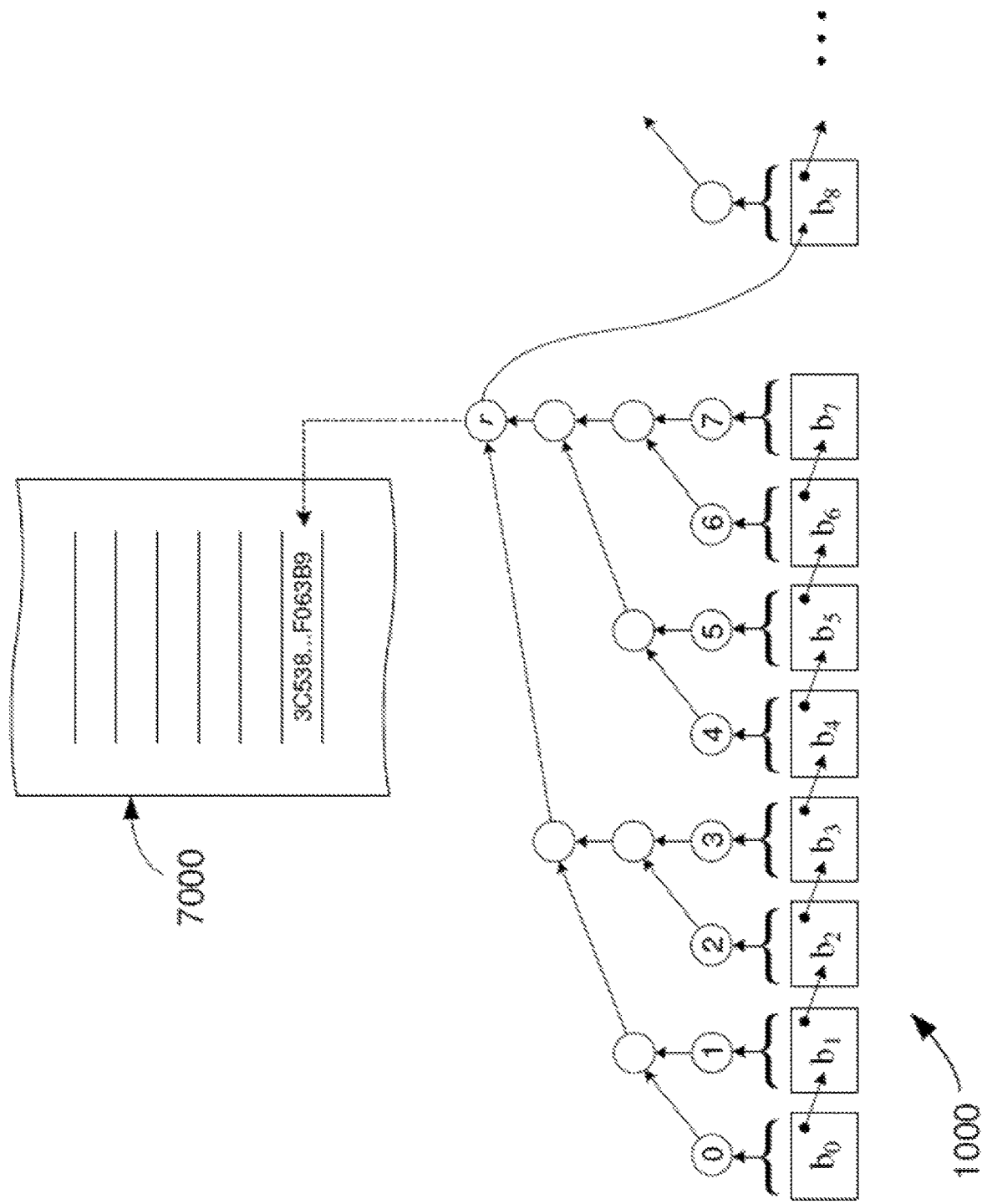
FIG. 6 shows an alternative history tree embodiment.

FIG. 6 illustrates another option, namely, that the root value for a history tree may be published in some widely witnessed, practically unalterable medium such as a widely available print publication 7000, or even some supervisory blockchain or ledger. As mentioned above, embodiments of this invention may be used with both open and closed/proprietary blockchains. The publication mechanism 7000 could even be private, such as a file within an enterprise's internal network, and as long as the blockchain is accessible to the enterprise. In other words, even if the blockchain itself is accessible to outside entities, a private entity could maintain its own internal confirmation mechanism using any form of archiving or permanent recording of any, or any function of, root values.

In the embodiment illustrated in FIGS. 3 and 4, entire history trees are included in at least some of the blocks in the blockchain. In the extreme case, the entire history tree from the genesis block may be encoded into each subsequent block. This may of course require not only increasingly large storage, but may also entail maintenance of portions of a history tree that are no longer relevant. In the embodiment illustrated in FIG. 6, the entirety of a history tree is "collapsed" into its root value, which is then passed to the next group of blocks. This makes it possible to keep the number of tree nodes to no greater than a chosen maximum, but it also means loss of block-level "leaf" information for the whole of the "collapsed" tree.

Figure 7A:
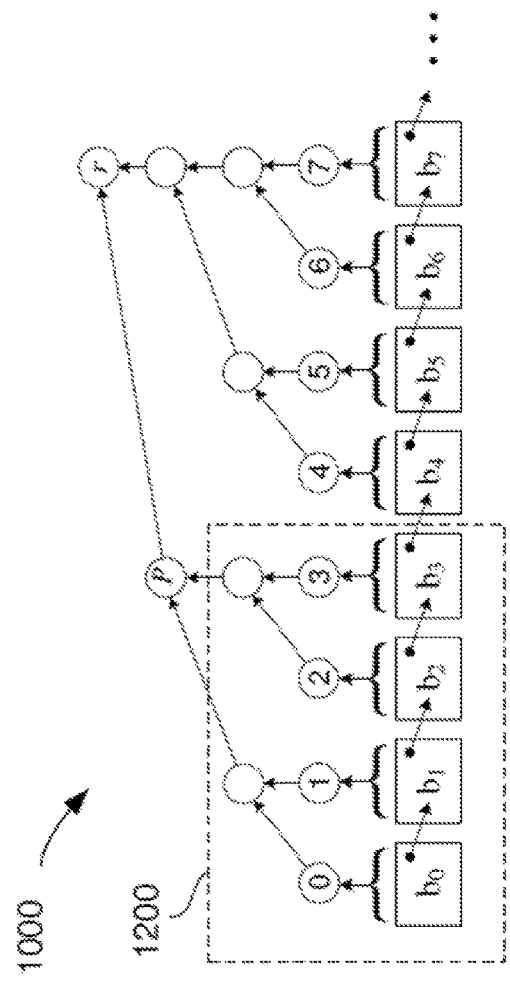
FIG. 7a illustrates "pruning" of a history tree.
Figure 7B:
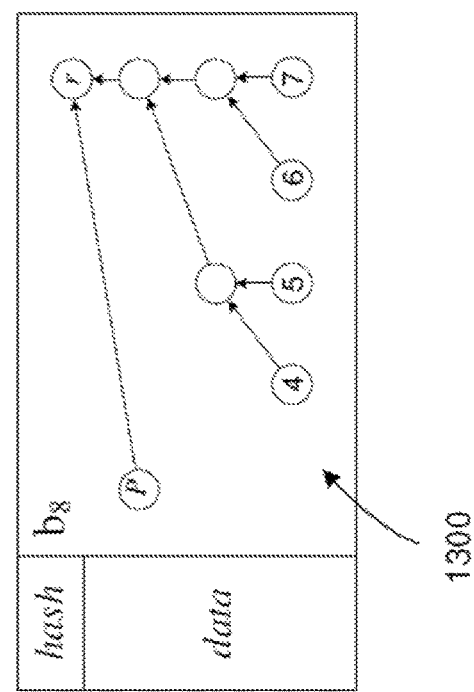
FIG. 7b illustrates how a pruned history tree may be included in a blockchain block.

FIGS. 7a and 7b illustrate another embodiment that falls between the "all or none" approaches. To understand FIGS. 7a and 7b, consider a greatly simplified case in which there are eight blocks $b_0$-$b_7$ for which a history tree has been constructed. In realistic implementations, the tree may contain orders of magnitude more leaves. Now assume that the information in blocks $b_0$-$b_3$ is no longer needed. For example, block information before some time or some event (that is, a particular block) might no longer be relevant to current or future needs. This means that the leaf nodes and computation nodes leading to node P, that is, the nodes within the dashed box 1200, are also not needed. In this embodiment, the branches of the history tree below node P, that is, the sub-tree below P, is therefore deleted, that is, "pruned" from the subsequent representations of the history tree, such that the pruned sub-tree is "collapsed" into its partial root value P. Pruning may be done by whichever entity is adding the next block to the blockchain, or by a validator, or any other chosen entity.

The history tree passed to and stored in the next bloc $b_8$ will therefore be as shown in FIG. 7b, where P's sub-tree is replaced with only P, but the rest of the history tree, including leaf-level information, is intact. All the currently relevant information in the history tree is thus preserved, while the tree information no longer needed is "compressed" into its partial root value P. Of course, the "pruning" process shown in FIGS. 7a and 7b may be repeated at different points in the blockchain, and pruned sub-trees may be archived for later recovery or examination.

In several instances mentioned above, one or more of the history trees, or selected blocks, may be "fixed" not only by virtue of being in the blockchain 1000, but also by using a secondary method that can be independent of the blockchain. In other words, sets of values can be "signed" so that any changes can be detected. One way to sign values is to include them in yet another, independent blockchain. Another alternative is to use standard PKI-based signatures.

A particularly advantageous signing method is disclosed in U.S. Pat. No. 8,719,576 (also Buldas, et al., "Document verification with distributed calendar infrastructure"), assigned to Guardtime, Inc., which is incorporated here by reference. The Guardtime signature infrastructure takes essentially arbitrary data sets as inputs, and then combines them iteratively and pairwise in a hash tree until a root value is computed for all the inputs during a "calendar period". Each root value is entered into a data structure called a "calendar", which also implements a Merkle tree to progressively combine the calendar values to create an uppermost value, which can then periodically be published either physically or digitally. A Guardtime signature comprises a vector of parameters enabling recomputation of the pairwise hash operations up to at least the level of the respective calendar value, and, after extension, to the published value.

One advantage of the Guardtime infrastructure is its enormous scalability and flexibility. Furthermore, a Guardtime signature is highly "portable" since it can prove that a purportedly authentic instance of a data set has not been altered given the instance and its signature, without necessarily requiring access to an external authority and without requiring keys, a certificate authority, etc. The Guardtime signature can thus be stored or shared openly, with no intrinsic need for additional security measures such as keys. Still another advantageous feature of a Guardtime signature is that it is associated with the calendar time in which it was generated, such that the signature also can act as a timestamp.

Assume that a user has submitted data identifying an event, this has been recorded in the blockchain 1000, and an administrator (for example, one of the validators) has returned a receipt for the event. This receipt will typically include a hash of the respective event, the hash path of the block hash tree up to its root Rblk stored within the block, and any other chosen information, such as information enabling identification of the corresponding block, such as block ID and the event/transaction ID, plus, depending on the implementation and embodiment, other data such as the time the block was created, an identifier of the blockchain itself, the set of validators that validated the block (as shown by the signatures in the block). To reduce the size of the receipt, it would also be possible for the receipt to comprise a pointer into a database that contains the detailed receipt information.

Now assume that a third party wishes to verify that an event (in the sense described above) occurred and was properly registered in a valid block within the blockchain. The user may then present (for example, simply by sending it electronically) the corresponding receipt to the third party, who can then recompute the block hash tree path defined in the receipt to see if it leads to the same value Rblk stored in the block.

Embodiments of this invention provide methods that allow the verifying third party to also determine, at least with greater reliability than before, that the block itself is valid. One way to do this is to check the identities, via the signatures, of the validators that participated in approving the block. Another way is to take the values in the purportedly valid block and recompute the included history tree, from the leaf values (which will include information from at least one previous block), iteratively and pairwise, through the intermediate node values, to the root, to check whether the root value is the same as it was when the block was first created. Note that that a root value will be stored within the block, or may be stored in a database, or, depending on what is passed from the block, may also be available in a subsequent block or block group. If this verification is successful, the third party may with higher confidence than before accept the description of the event as being correct, at least in the sense of being the same as it was purported to be.

On the other hand, verification of either the event/receipt and/or block may fail. For example, one or more validator signatures may not be verifiable, or there may be an insufficient number of them, or the signature of a later disqualified validator may be found. Using the history tree embodiment, recomputation of the history tree may fail. In such cases, any violation protocol may be followed. At the simplest level, the third party may simply decline to accept the user's submitted receipt as being valid for whatever purpose it was submitted. Such a verification failure may also be a triggering event as described above, where the validators, or the entities comprising the reconciliation system (some or all of whom may be the same as the validators), initiate a review and possible recomputation of the blockchain from some block known to be valid.

Although the validator signature embodiment and the history tree embodiment are described in separate text sections above, it would be possible in yet another embodiment to include both verification mechanisms in blockchain blocks. In other words, blocks could contain validator signatures, and also a history tree. To further integrate the mechanisms, it would be possible to include a function (preferably, hash) of the validator signatures in the data used as the leaf values of the history tree.

Alternatives to Trees

In the embodiments described above, hash trees 1300 are described as the data structure that aggregates block values, or current block together with a value that itself represents an aggregation of values of some group of previous blocks. First of all, the hash trees are illustrated as being binary (two siblings at a time are hashed together). This generally simplifies "bookkeeping", that is, makes it relatively easy to organize, but it is not a requirement; ternary and even higher-degree trees may be implemented using known techniques.

Hash trees are not the only data structures that may be used to progressively aggregate block values. In general, any cryptologic data structure may be used instead that aggregates two or more inputs to create at least one highest level value such that a computation path is defined and that enables recomputation of the highest level value given a chosen one of the inputs.

Figure 8A:
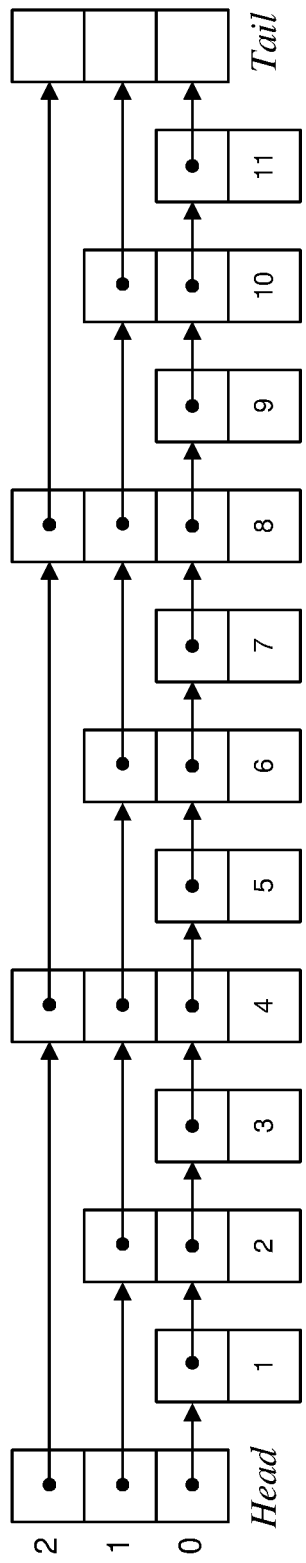
FIGS. 8A and 8B illustrate different concepts relating to a skip list.

One such alternative structure is a variation of a skip list, which is a well-known data structure first described in Pugh, William, "Concurrent Maintenance of Skip Lists", (Technical report), Dept. of Computer Science, U. Maryland, CS-TR-2222, (April 1989). See FIG. 8A. In summary, a skip list is a data structure that comprises a hierarchy of "layers" (in FIG. 8A layers 0, 1, 2, although any number may be included) of linked lists of ordered sequences of elements, each having an initial (Head) and final (Tail) value. The lowest layer comprises the full ordered sequence of values (such as share values). Higher layers contain successively sparser elements and are used to successively "bracket" values in lower layers until a desired element is located. In FIG. 8A, arrows between "boxes" indicate pointers. One feature of a skip list is that it enables searching with far fewer average operations than a linear search of the lowest level linked list would require. Another feature is that it allows for insertions and deletions without requiring the search path of elements from Head to Tail to change.

Figure 8B:
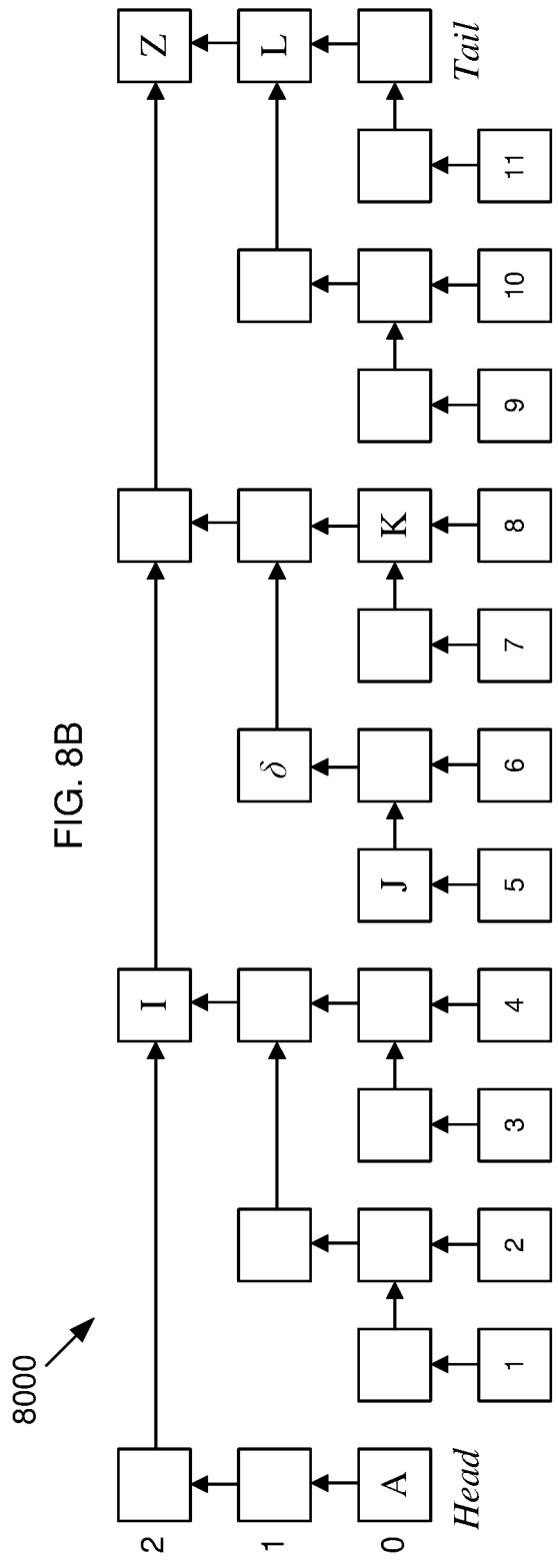

FIG. 8B shows a modification of the skip list 8000, in which arrows between "boxes" indicate hashing operations instead of simple pointers. Thus, the value K=hash (hash(7)|8), where "7" and "8" indicate the values stored in the respective numbered elements. Similarly, Z=hash(hash (I|hash(δ|K))|L), and so on. For every element 1-11, there is a unique hash path (a "chain") to the highest level Tail value, that is, in FIG. 8B, the value Z. Values I and J are the previous and K and L are the subsequent sibling values on the path from 6 to Z. An initial Head value A may be included to form an initial "seed" for the structure.

To use a skip list such as is shown in FIGS. 8A and 8B in embodiments of the invention, the share values (or node input values) may form the lowest level elements (1-11 in FIG. 8B) and the value Z may be used in the manner described above for a hash tree root. The path from each element to the Tail value Z may then function in a manner similar to a hash chain. Especially where large numbers of shares are anticipated, use of a skip list may enable an auditor to more quickly search for and find a share value in question.

Directed Acyclic Graph (DAG)

Figure 9A:
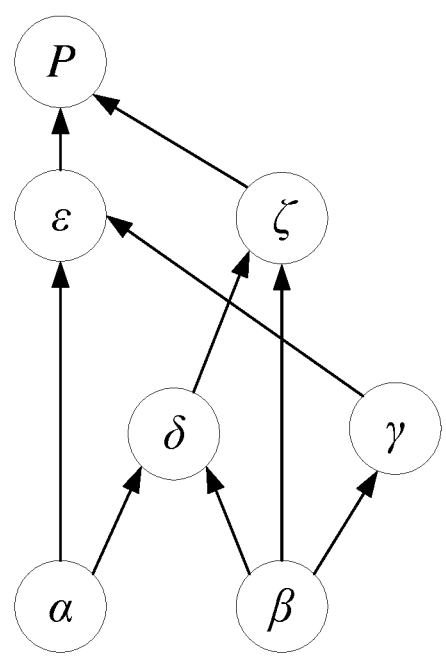
FIGS. 9A-9B illustrate different concepts relating to a directed acyclic graph.

See FIG. 9A, which illustrates a simple example of a Directed Acyclic Graph (DAG), of which the known "Hashgraph" is one example. A DAG is a data structure that has lowest level nodes, similar to hash tree "leaves", which themselves have no even lower level nodes. "Edges" of the DAG connect nodes have a direction (the "D" of "DAG") such that data flow (and processing, such as hashing of the values of incoming nodes) proceeds from node to node to a final node (the "root") that itself has no higher level node. Data flow follows one or more paths in such a way that no path from a lowest level node to the root node passes the same node more than once (thus, the acyclic "A" of "DAG"). Unlike in a conventional n-degree hash tree, or in a conventional linear blockchain, the value of a node can be passed upward/onward to more than one subsequent/higher-order node, that is, a node farther along the path to the root or a most recent value. Moreover, the higher-order node need not in every case be the immediately higher order node; indeed, depending on the configuration, other than the lowest level (input) nodes and the root, there need not be any clear hierarchy at all. Note that the structure of a conventional linear blockchain is a very simple form of directed, acyclic graph, namely, a computationally one-way "line" of blocks.

Figure 9B:
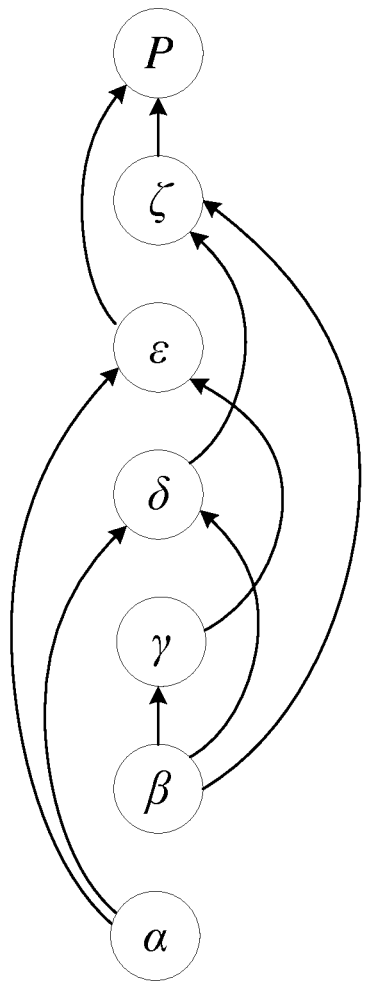

In FIG. 9A, for example, there are six nodes α, β, δ, γ, ε, and ζ that pass values onwards, and an end, root node P. Note that, in the illustrated, simple example, there are two paths from α that lead to P (α→ε→P and α→δ→ζ→P) whereas there are three paths from β to P. FIG. 9B shows the DAG example of FIG. 8A using a "linear" representation.

In the description above, and related figures, the data structure 1000 used to register transactions is a linear blockchain. A DAG is yet another option that could be used to implement this feature instead of the linear blockchain. In such cases, the nodes could perform calculations (such as hashing) on incoming values. Note that, even though the node P forms an "end point" of the DAG shown in FIGS. 9A and 9B, the DAG could be extended such that the node P is a lowest level or even intermediate node of some other, for example, follow-on DAG.

Similarly, the hash tree structure 1300 described above acts as a "history" data structure, in that it encodes information about previous blocks. If a DAG structure is used instead of the linear blockchain, a history data structure may also be included in any or all of its nodes. The history data structure could again be a hash tree that is stored in and grows in the DAG nodes, but it could also be other DAGs stored in the main DAG nodes. These "history DAGs" may, for example, include nodes corresponding to all or some subset of preceding DAG nodes, which may be identified in any known manner, such as an index value or other identifier.

Multiple History Structures

The mapping between the elements (such as input nodes) of the history tree (or other data structure, such as skip list, etc.) and blocks does not have to be 1:1. Thus, each blockchain block (or other structural element) could contain multiple history trees, each for a possibly different subset of blocks. For example, one tree could contain references to all blocks where validator set is changed or has been entered by an administrator or one or more other designated, identifiable entities; another tree could encode only blocks that include certain types of information or state, etc.

Figure 10:
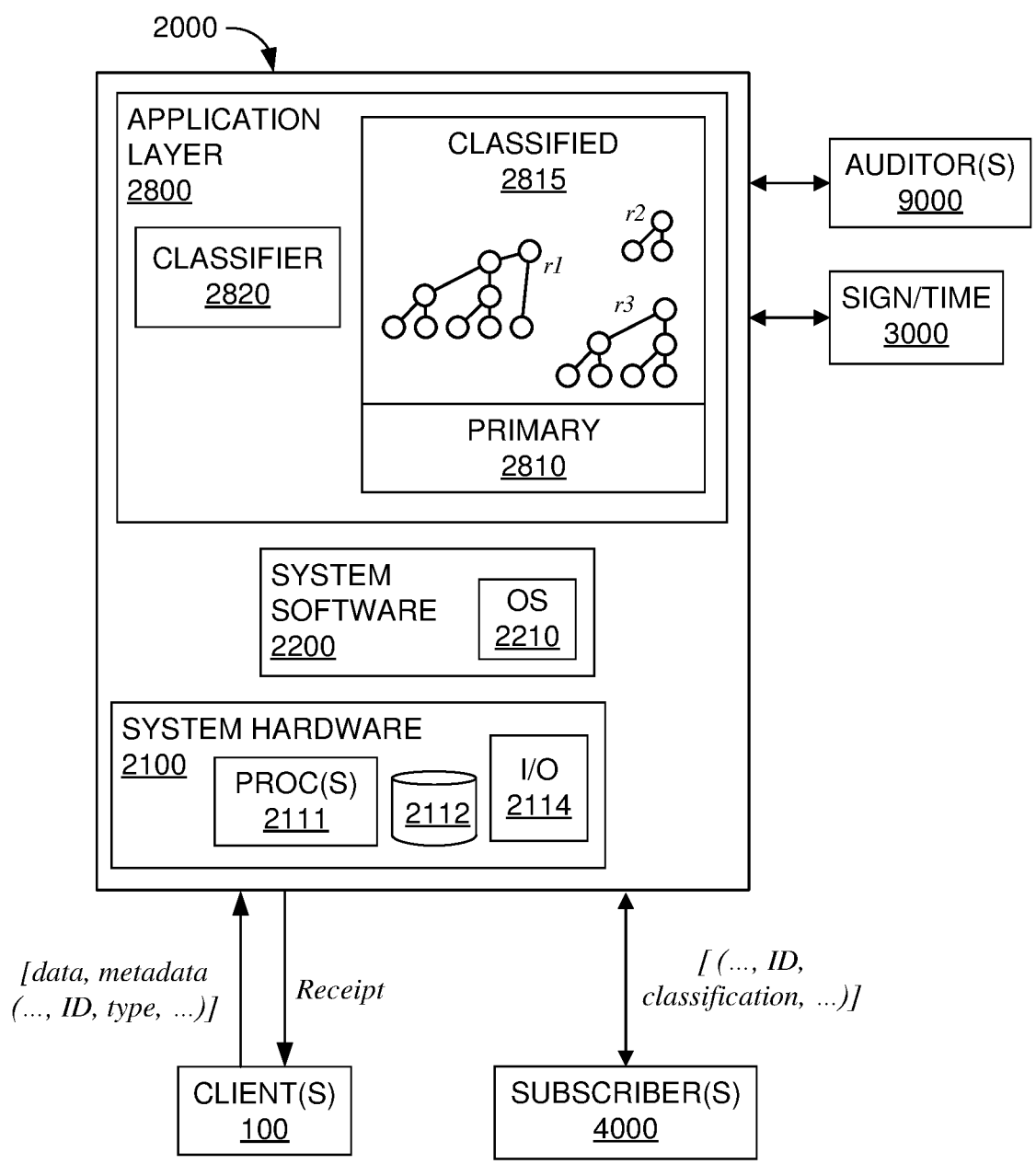
FIG. 10 illustrates the main hardware and software components of systems that may be used to implement different entities described below, as well as components used in one embodiment for enabling classified, reduced data structures.

The selection of which blocks (or other elements) $b_i$ to include in a given history data structure (tree 1300, skip list 8000, etc.) may be according to central rules, according to user or even client choice, according to some other rules, or any combination of these. FIG. 10 shows a plurality of "classified" (in the sense of having a particular purpose or characteristic), "reduced" history data structures (as shown, hash trees) maintained in a module 2815 within an administrative system 2000. As shown, each tree happens to have a different number of lowest level node values, leading to respective root values r1, r2, r3. These lowest level node values may be subsets of the input (for example, block) values of the full-length, primary blockchain 1000, which may be stored (in system memory or storage) and maintained as a data structure by a module 2810. Alternatively, the classified history data structures 2815 could be subsets of the global structure 1300.

Some examples of administrative-level rules that a software component such as the classifier 2820 could apply to determine which blockchain 1000 blocks (or other information) are used to establish a corresponding classified tree include, without limitation, all blocks that have a particular characteristic, such as including information relating to a particular type of transaction/event, or from a particular client or set of clients or other source, or during a chosen time period, or representing specified system events or state changes, or having been approved by one or more specified validators, etc. For example, a company might pay to be (or be accepted as) a subscriber 4000, which may specify that it wishes a history data structure to be established, updated, and made available relating to its customers. In FIG. 10, among other information, a subscriber may thus send to the system 2000 information such as its ID and classification information (for example, from which clients 100 block information has been submitted, time frames, etc.) sufficient to communicate to the classifier component 2820 which blocks it wishes to be included in its history tree/structure. Note that a client 100 may also be a subscriber. Similarly, an auditor 9000 may wish to have a specific history tree established for a particular entity/client that it will need to audit, possibly also while retaining an ability to examine the full, primary blockchain 1000.

In implementations that enable specification of reduced history structures, it will often be necessary for blocks of the blockchain (or other structural elements) to be classifiable. In some cases, such as where reduced trees are built up for blocks in a given time interval, the classification may be implicit or may be determined apart from the blocks themselves. In other cases, such as in an implementation in which blocks are classified per customer, or transaction type, clients (which will themselves typically be computer systems themselves) may be required to submit ID information or an indication of the type of information being submitted. In some other cases, ID may be based on, for example, an IP or MAC address, or a mobile device's International Mobile Station Equipment Identity (IMEI), in which case it may not be necessary for a client itself to explicitly submit such information itself.

The "reduced", classified history structures need not include exactly the same information as the blocks they encode. As one option, the inputs to the reduced history trees/structures could be pointers or other identifiers to those blocks in the primary blockchain 1000.

In another embodiment, the administrative system 2000 does not build and maintain the reduced, classified history data structures 2815, but rather passes to subscribers the information (such as a copy of a block, or its relevant part, or its identifiers, as needed to meet a subscription definition) necessary to enable them to build and maintain their own reduced trees. Before passing the block information to the subscribers, the administrative system may also obtain a signature (possibly with a timestamp) from any available system 3000 (for example, the Guardtime infrastructure) so as to enable verification that a correct copy/subset was transmitted. Subscribers may thus maintain "unofficial" reduced trees grown from only the blocks they have designated as of interest and received.

System Implementation

FIG. 10 also illustrates the main hardware and software components of a computing system that may be used to implement any of the entities, that is, the administrative system, a node in a multi-entity blockchain administration network, a client, a subscriber, etc., or any system with which these need to communicate.

In general, each computing system 2000 will include standard components such as system hardware 2100 with at least one processor 2111, some form of system software 2220 such as including an operating system 2210 and/or virtual machine hypervisor, as well as volatile and/or non-volatile memory and/or storage, which is indicated "collectively" as component 2112. The various data structures described herein, as well as the processor-executable code created to embody the software modules used to carry out the various computations and functions illustrated in previous figures, may be stored and thus embodied in either or both types of memory/storage components. Especially given the proliferation of high-speed "non-volatile" storage components, the difference between these two component classes is becoming less relevant. The software modules will comprise processor-executable code that, when run by the processor(s) 2111, cause the processor(s) to carry out the corresponding functions. Standard I/O access components 2114 may also be included in each device to enable communication with other entities and systems over any known type of network, wireless or wired.

The system 2000 will typically include an application layer 2800, which comprises various software modules for performing the functions described above, for example, depending on the entity, analyzing and classifying incoming blocks for inclusion in reduced tree, maintaining the primary blockchain or a copy of it, etc.

What is claimed is:

1. A method for testing the validity of entries in a directed data structure, comprising:

in at least one node server, registering an event in the directed data structure, said directed data structure comprising a computationally linked series of nodes such that each node encodes information included in at least one preceding node;

within at least selected nodes of the directed data structure after at least one initial node in a group of nodes which includes the initial node, including a representation of at least one history data structure having a highest-level value computed based on inputs of lowest level input values, at least one said lowest level input value encoding node-specific information of at least the one preceding node, said history data structure for each subsequent node in the group of nodes progressively growing by addition of another one of the lowest level input values corresponding to the current node, said history data structure thereby having a corresponding new highest-level value;

in a verification phase, verifying a purportedly valid lowest level input value in a selected one of the nodes by recomputing the corresponding highest-level value from the representation of the history data structure included in the selected one of the nodes, and accepting the purportedly valid lowest level input value as being valid only if the recomputed highest-level value is the same as the highest-level value originally computed for the history data structure included in the corresponding selected one of the nodes.

2. The method of claim 1, in which the directed data structure is a blockchain.

3. The method of claim 1, in which the history data structure is a skip list.

4. The method of claim 1, in which the history data structure is a directed acyclic graph.

5. The method of claim 1, further comprising:

registering at least one event in a current node at the request of at least one client;

for each event registered at the request of the client, returning to the respective client system a receipt, said receipt encoding at least an identifier of the current node recomputation values enabling recomputation of the highest level value of the history data structure in the respective current node.

6. The method of claim 1, further comprising including a plurality of reduced history data structures in at least one of the nodes, the lowest level input values of the respective reduced history data structures encoding information from different subsets of the preceding nodes of the directed data structure having respective characteristics.

7. The method of claim 6, further comprising:

receiving from at least one subscriber a request to create and maintain a respective subscriber-associated reduced history data structure as one of the plurality of reduced history data structures; and including as the lowest level input values of the subscriber-associated reduced history data structure information derived from nodes of the directed data structure exhibiting having at least one characteristic defined by the respective subscriber.

8. The method of claim 6, in which the lowest level input values of the reduced history data structures are pointers identifying respective ones of the nodes of the directed data structure.

9. The method of claim 1, further comprising:

receiving from at least one subscriber a request to create and maintain a respective subscriber-associated reduced history data structure constructed from information only from nodes having at least one subscriber-designated characteristic;

identifying nodes of the directed data structure that have the at least one characteristic; and transferring to the respective subscriber information relating to the identified nodes sufficient to enable the subscriber to externally construct and maintain the respective subscriber-associated reduced history data structure.

* * * * *